Oct. 7, 1947.          R. W. LUCE          2,428,463
THREADED LOCKING DEVICE
Filed Dec. 30, 1942

INVENTOR.
RICHARD W. LUCE
BY
George F. Gill
ATTORNEY

Patented Oct. 7, 1947

2,428,463

UNITED STATES PATENT OFFICE 2,428,463

THREADED LOCKING DEVICE

Richard W. Luce, Southport, Conn.

Application December 30, 1942, Serial No. 470,583

7 Claims. (Cl. 151—21)

The invention herein disclosed relates to a threaded locking device of the kind disclosed in the co-pending application Serial No. 322,650, filed March 7, 1940, for Threaded locking device, which issued June 1, 1943, as Patent No. 2,320,785.

An object of the present invention is to provide a threaded locking device of this kind that may be made from sheet metal. Another object of the invention is to provide a threaded locking device that is comparatively light in weight, yet reliable in service and comparatively inexpensive to manufacture.

Figure 1:
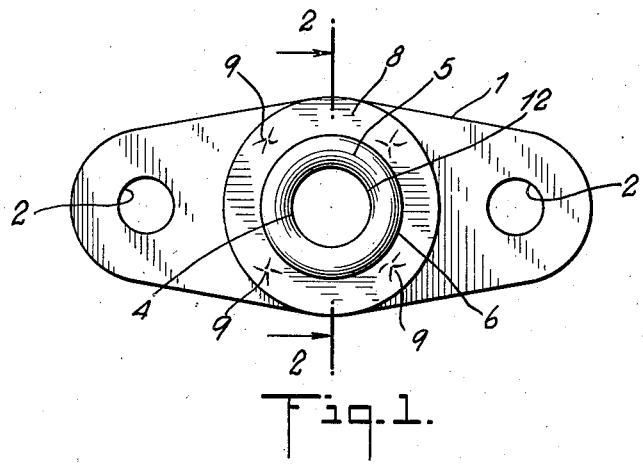
Figure 2:
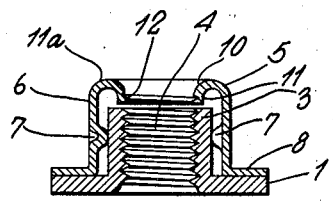
Figure 3:
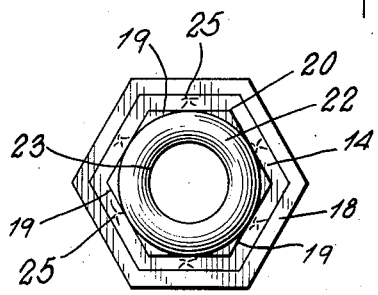

The foregoing objects and certain advantages that will hereinafter appear will be apparent in the specific embodiments of the invention illustrated in the accompanying drawings and described in detail below. The drawings include:

Fig. 1 which is a plan view of an anchor nut embodying the invention;

Fig. 2 which is a sectional elevation of the same taken on the line 2—2 of Fig. 2;

Fig. 3 which is a plan of a hexagonal nut embodying the invention; and

Figure 4:
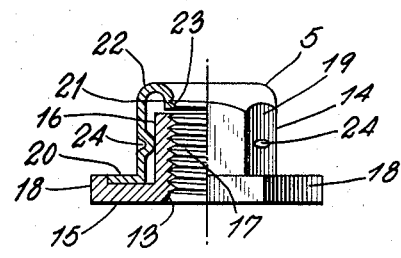

Fig. 4 which is a semi-sectional elevation of the same.

The nut illustrated in Figs. 1 and 2 of the drawings is an anchor nut. Such a nut includes a flange 1 having openings 2 therethrough through which the flange 1 may be secured, as by rivets, to one of two plates to be secured together. In the anchor nut illustrated a boss 3 extends from the flange perpendicularly thereto. This boss is tapped to form the load-carrying thread 4 therein. The flange and boss are an integral piece of metal drawn and stamped from sheet metal.

To the flange 1, there is secured another sheet metal element denoted generally by the numeral 5. This element includes a cylindrical portion 6 surrounding the boss 3. The internal diameter of this cylindrical portion is somewhat greater than the external diameter of the boss. The cylindrical portion has three detents 7 therein spaced angularly about its axis through angles of one hundred and twenty degrees. These detents engage the boss and serve to center the cylindrical portion 6 about the boss.

At one end of the cylindrical portion 6, there is an outwardly extending flange 8 which engages the flange 1. These flanges are secured together, as by spot welding, to secure the two metal elements together. The spot welding is indicated at 9, Fig. 1.

At the opposite end of the cylindrical portion, there is an inturned flange 10. The inwardly extending flange 10 is bent through an angle of approximately one hundred and eighty degrees to form an axially extending end portion 11, axially alined with the threaded boss 3 and a curved resilient portion 11a uniting the cylindrical portion 6 and the axially extending end portion. The axially extending end portion has a thread 12 therein of the same pitch as the thread 4 in the boss, but it is normally positioned, axially spaced from the end of the boss and with the thread thereof normally out of phase with the thread of the boss.

Each of the elements are produced separately without the threads therein. The elements consisting of the flange 1 and the boss 3 may desirably be of sheet metal thicker than that from which the element 5 is made and sufficiently thick to have, when tapped, the desired pull strength. The element 5 is desirably made from metal of a thinness such as to give the desired resiliency to the resilient portion 11a. The two elements, unthreaded, are assembled in the relation illustrated. The flanges 1 and 8 are then spot welded. Next, the nut is tapped, the tap being run through both the boss 3 and the axially extending end portion 10 of the element 5. Then the nut is compressed to cause the resilient portion 11 to take a set with the thread 12 out of phase, slightly less than half the pitch of the thread, with the thread 4.

When a bolt is entered in the nut, it first engages the thread 4. To enter the thread 12, the resilient portion bends to permit the thread 12 to come into coincidence with the thread of the bolt. The resilient portion thus exerts an axial force which causes the thread of the bolt and the thread 4 to engage in surface, frictional contact.

In Figs. 3 and 4 of the drawing there is disclosed a hexagonal nut of similar construction. This nut includes two elements denoted generally by the numerals 13 and 14. The element 13 includes a flange 15 and a boss 16 extending perpendicularly from the flange. The boss has the load-carrying thread 17 formed therein. The flange 15 has a polygonal perimeter, specifically hexagonal, and the end section 18 thereof is bent to extend perpendicular to the flange.

In this construction also the element 14 may be of lesser thickness than the element 13. This element includes a portion 19 that surrounds the boss 16. The portion 20 is of hexagonal configuration in transverse section. At one end of the portion 19, there is an outwardly extending flange 20 the perimeter of which is of hexagonal configuration. The flange 20 is received in and engages the end section 18 of the flange 15.

At the opposite end of the portion 19, there is an inturned flange bent through an angle of approximately one hundred and eighty degrees to form an axially extending end portion 21 axially spaced from the edge of the boss and united to the portion 19 by a curved resilient portion 22. The axially extending end portion has a thread 23 therein of the same pitch as the thread 17. It is normally held by the resilient portion 22 with the thread thereof out of phase with the thread 17 in a direction towards the boss 16. The end portion and the portion 19 are centered with respect to the boss 16 by detents 24 formed in the flats of the portion 19.

In constructing this nut the elements 13 and 14 are made separately. They are assembled unthreaded as illustrated and the flanges 15 and 20 are spot welded as indicated at 25. The nut is then tapped, the tap being run through the boss 16 and the axially extending end portion 21. Thereafter, the nut is compressed to cause the thread 23 to be out of phase with the thread 17.

The engagement between the edge of the flange 20 and the end section 18 of the flange 15 serves to transmit wrenching torque to the flange 15 without too much strain on the spot welds. Normally in applying the nut a wrench is applied to the flats of the portion 19 and the torque applied must be transmitted to the element 13.

From the foregoing description of the embodiments of the invention illustrated in the drawings and specifically described above, it will be seen that by this invention there is provided a light, reliable and inexpensive threaded locking device of the kind to which the invention relates. The parts are stamped and drawn from sheet metal and may be made on automatic machinery.

It will be obvious that various changes may be made by those skilled in the art in the details of the embodiments of the invention illustrated in the drawing and described in detail above within the principle and scope of the invention as expressed in the appended claims.

I claim:

1. A thread locking device of the kind described comprising in combination a metal element including a flange and a boss extending from the flange substantially perpendicularly thereto, the boss having the load-carrying thread therein, and another metal element secured to said first mentioned element and including a portion surrounding the boss of said first mentioned element and an inturned flange extending over the edge of the boss and having a thread therein of like pitch as the thread of the boss, the thread in the flange being normally out of phase with the thread of the boss.

2. A threaded locking device of the kind described comprising in combination a metal element including a flange and a boss extending from the flange substantially perpendicularly thereto, the boss having the load-carrying thread therein, and another metal element secured to said first mentioned element and including a portion surrounding the boss of said first mentioned element and an inturned flange bent through an angle of substantially one hundred and eighty degrees to form an axially extending end portion, the said end portion having a thread therein of like pitch as the thread of the boss and being normally positioned with the thread thereof out of phase with the thread of the boss.

3. A threaded locking device of the kind described comprising in combination a metal element of one thickness including a flange and a boss extending from the flange substantially perpendicularly thereto, the boss having the load-carrying thread therein, and another metal element of lesser thickness than the first mentioned element secured thereto and including a portion surrounding the boss and an inturned flange bent through an angle of substantially one hundred and eighty degrees to form an axially extending end portion axially spaced from the end of the boss, the said end portion having a thread therein of like pitch as the thread of the boss and being normally positioned with the thread thereof out of phase with the thread of the boss.

4. A hexagonal lock-nut of the kind described comprising in combination a metal element including a flange and a boss extending from the flange substantially perpendicularly thereto, the boss having the load-carrying threads therein, and another metal element secured thereto and including a hexagonal portion surrounding the boss and an inturned flange bent through an angle of substantially one hundred and eighty degrees to form a cylindrical axially extending portion axially spaced from the end of the boss, the said end portion having a thread therein of like pitch as the thread of the boss and being normally positioned with the thread thereof out of phase with the thread of the boss.

5. A threaded locking device of the kind described comprising in combination a metal element having an opening therethrough with the load-carrying thread therein, and another metal element secured to said first mentioned element and including a portion secured to said first mentioned element and an inturned flange extending over the edge of the first mentioned element and having a thread therein of like pitch as the thread of the first mentioned element and normally out of phase therewith.

6. A threaded locking device of the kind described comprising in combination a metal element having an opening therethrough with the load-carrying thread therein, and another metal element secured to said first mentioned element and including a portion surrounding the first mentioned element and secured thereto and an inturned flange extending over the edge of the first mentioned element and having a thread therein of like pitch as the thread of the first mentioned element and normally out of phase therewith.

7. A threaded locking device of the kind described comprising in combination a metal element having an opening therethrough with the load-carrying thread therein, and another metal element secured to said first mentioned element and including a portion surrounding the first mentioned element and an inturned flange extending over the edge of the first mentioned element and resiliently retaining a threaded portion in axially aligned relation with the thread of the first mentioned element, said threaded portion being axially spaced from the thread of the first mentioned element and having a thread of like pitch as the thread of the first mentioned element and normally out of phase therewith.

RICHARD W. LUCE.

REFERENCES CITED

The following references are of record in the file of this patent:

UNITED STATES PATENTS

| Number | Name | Date |
| --- | --- | --- |
| 2,163,134 | Semion | June 20, 1939 |
| 2,320,785 | Luce | June 1, 1943 |
| 2,295,234 | Poupitch | Sept. 8, 1942 |
| 2,324,731 | Simmonds | July 20, 1943 |
| 2,154,174 | Marchou | Apr. 11, 1939 |

FOREIGN PATENTS

| Number | Country | Date |
| --- | --- | --- |
| 551,214 | Great Britain | July 2, 1942 |